June 27, 1967     G. S. SPENCER     3,327,822
ELECTROMAGNETIC CLUTCH OR BRAKE
Filed Aug. 6, 1965
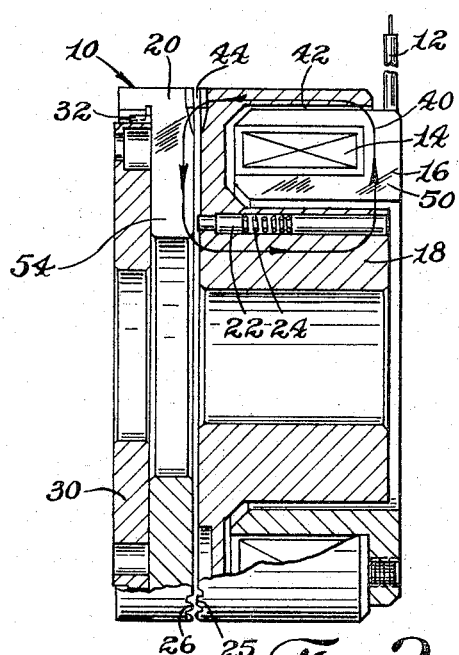
Fig. 2
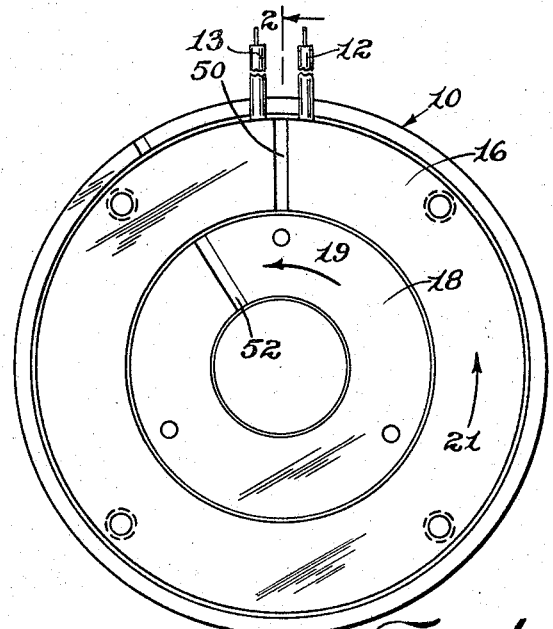
Fig. 1
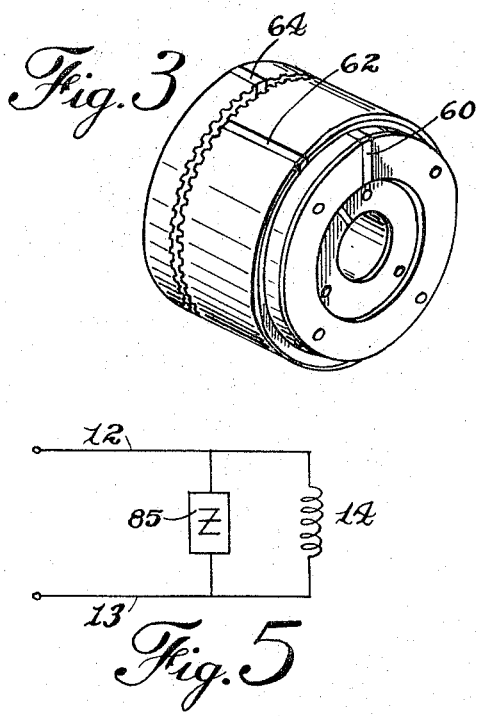
Fig. 3
Fig. 5
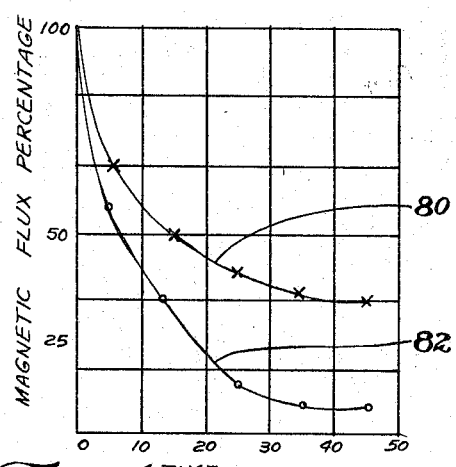
Fig. 4
INVENTOR.
Glenn S. Spencer
BY
ATTORNEY

United States Patent Office 3,327,822
Patented June 27, 1967

3,327,822
ELECTROMAGNETIC CLUTCH OR BRAKE
Glenn S. Spencer, Big Flats, N.Y., assignor to The Bendix Corporation, Elmira, N.Y., a corporation of Delaware
Filed Aug. 6, 1965, Ser. No. 477,872
6 Claims. (Cl. 192—84)

The present invention relates to electromagnetic clutches and brakes and, more particularly, to an improved magnetic circuit design which greatly reduces switching time in electromagnetically-controlled clutches and brakes.

Prior are devices of this type required significant and troublesome delay times in switching to and from torque or energy transmission or absorption. This troublesome time delay appeared to be the inevitable result of rapidly changing magnetic flux which would induce a large eddy current in the magnetic circuit members.

It is an object of the present invention to provide an improved magnetic circuit design which reduces eddy currents.

It is an object of the present invention to provide a novel magnetic circuit design which greatly reduces switching time in electromagnetically-controlled clutches and brakes.

It is an object of the present invention to provide a novel magnetic circuit design which does not significantly reduce magnetic flux density.

It is another object of the present invention to provide a novel magnetic circuit design which does not significantly reduce the mechanical strength of the magnetic circuit members nor significantly reduce their torque transmitting capabilities.

It is still another object of the present invention to provide a novel magnetic circuit design which significantly reduces eddy current effects and which is inexpensive and reliable.

It is still another object of the present invention to provide a novel magnetic circuit structure which may be used with rotating or non-rotating magnetic flux conducting members.

Additional objects and advantages will be readily apparent from the following description taken in conjunction with the accompanying figures of one embodiment of the present invention in which:

FIGURE 1 is an axial view of an electromagnetic clutch;

FIGURE 2 is a view of the electromagnetic clutch shown in FIGURE 1 taken along the plane 2—2 and partly broken away and partly in section;

FIGURE 3 is a perspective view of an electromagnetic clutch or brake;

FIGURE 4 is a graph illustrating the performance of an embodiment of the present invention; and FIGURE 5 shows an electrical circuit which may be used in conjunction with the present invention.

Turning now to FIGURE 1, numeral 10 indicates generally an electromagnetic clutch having a pair of lead wires 12 and 13 to deliver current to the electromagnet 14 housed in the magnet body 16. In the embodiment shown, the magnet body 16 is stationary and is linked in the magnetic circuit to the magnet plate member 18 which is an annular torque transmitting or energy transmitting or absorbing member. Mounted coaxially with the magnet plate member 18 is a second annular torque or energy transmitting member or armature 20. Plunger 22 is biased by spring 24 into holding the second torque transmitting member 20 away from the first torque transmitting member. Clutch dentil teeth 25 and 26 are formed respectively on the first and second torque transmitting members 18 and 20 to permit the transfer of torque therebetween. Friction surfaces formed on the torque transmitting members could be used in place of the dentil teeth to enable the members to transfer torque from one member to the other. Mounted coaxially with the armature or second torque transmitting member is spider member 30, mounted for rotation with the armature member on splines 32. For the purposes of the present invention, it makes no difference whether power or energy is supplied at the spider end of the clutch and taken off at the first torque transmitting member end or whether the reverse is true.

As indicated by the arrows in FIGURE 2, the magnetic circuit or magnetic flux path 40 goes through the magnet body 16, thence jumping the radial air gap 42 to the magnet plate member 18, thence jumping the axial air gap 44 to the armature member 20, thence returning to the magnet plate member 18, then jumping the air gap 42 and returning to the magnet body 16.

In the embodiment of the invention shown, the spring 24 and plunger 22 members bias the second torque transmitting member 20 away from the first torque transmitting member 18. Thus, when current is allowed to flow through the coil, the magnetic field builds up flux rapidly along the path previously indicated. This rapid time rate of change of flux induces a large eddy current which flows in a circumferential direction (as shown by arrows 19 and 21 in FIGURE 1) through the magnetic plate member 18, the magnet body member 16, and the armature member 20 and to some extent, in the spider member 30. The strength of the eddy current is naturally dependent upon the strength and density of the magnetic field present and its decay or build-up time. In accordance with Lenz' law, the eddy current created produces a countermagnetic flux which tends to oppose the building of the magnetic field. The eddy current and its corresponding opposing flux greatly decrease the time response of the electromagnetic clutch as shown by curve 80 in FIGURE 4. Similarly, when the electromagnetic clutch is in a torque-transmitting mode of operation and the external current to the coil is shut off, the magnetic flux in the loop previously indicated decreases rapidly, inducing an eddy current which, in turn, establishes an opposing magnetic flux, delaying the decay of the magnetic field, and slowing down the release of the clutch members. To avoid these time delays, a substantially-radial slot or gap is formed in the magnet body 16. Similar gaps may also be formed in the magnet plate member 18, in the armature member 20, and in the spider member 30. FIGURE 1 shows an air gap 50 in the magnet body member 16 and air gap 52 in the magnet plate member 18. FIGURE 3 shows a gap 60 in the magnet body member 16, 62 in the magnet plate member 18, and 64 in the armature member 20. In FIGURE 3, the gaps consist of resin or some other electrically non-conducting substance. The gaps, whether they be air, rubber, plastic, resin, or some other electrically non-conducting material, are substantially radial in nature so as to least decrease or affect the magnetic fields which exist in the magnetic circuit members. The gaps also are ideally the full axial dimension of the annulaar members, as shown in FIGURE 3, in order to eliminate completely all eddy currents. Still further, the gaps may be rather thin so long as their electrical resistivity is high. The electrically non-conducting gaps may be formed integrally in the magnetic circuit members by altering the electrical properties of a portion of the magnetic circuit members.

Results of the use of the gap in the magnetic structure are quite striking. Switching times are radically decreased, even when a gap is used only in the magnetic body member 16. Further improvements will result in the use of gaps in the magnetic plate member 18 and in the armature member 20.

The graph shown in FIGURE 4 illustrates the results of employing the present invention in an electromagnetic clutch having a combination magnet body-magnet plate member; i.e. a clutch using slip rings. Radial air gaps were disposed in the magnet body-magnet plate member and the armature member to obtain the curve 82. Curve 80 is the identical clutch without the radial air gaps disposed in the magnetic circuit members. Magnetic flux percentage of its steady state value is plotted on the vertical axis and time in milliseconds on the horizontal axis. In the graph shown, current to the coil of each clutch is turned off at time equal zero seconds. The prior art clutch magnetic flux takes about 15 milliseconds to drop to half its original value while the clutch utilizing the present invention takes about 7 milliseconds to reduce flux the same 50%. In the same 15 milliseconds that it took the flux on the prior art clutch to drop to 50% of its original level, the flux in the clutch utilizing the present invention drops to ⅓ of its original value. In 35 milliseconds, the magnetic flux in the prior art clutch is not yet reduced to ⅓ of its steady state value, while a clutch utilizing the present invention has a magnetic flux of about 1/12 of its original level. It can readily be seen that the present invention achieves the stated objects.

Torque transmitting capabilities are not significantly affected, either by reason of reduction in the magnetic field or from loss of mechanical strength. The largest decrease in switching time is procured when the eddy current is reduced in the largest magnetic member closest to the flux generator. Gaps located in other more remote or less massive magnetic members produce less gains, unless the magnetic members are more nearly equal in bulk and size than those shown in the present embodiment. Many electromagnetic clutches or brakes employ a single member which is a combination rotatable magnet body-magnet plate member. In such devices, current is supplied to the coil through slip rings. The present invention may also be practiced in connection with electromagnetically-controlled brakes in which there is only a single rotating member. In such cases, it is customary for the magnet body member and magnet to be non-rotating. The energy or torque absorbing member is also non-rotating.

FIGURE 5 shows an electrical circuit which may be used in conjunction with the present invention. Lead wires 12 and 13 provide current for the electro-magnet or inductance 14. Connected in shunt or parallel with the inductance 14 is an electrical impedance 85 represented by Z. The electrical impedance Z may be a capacitor, a resistor, a diode and resistor combination, or a capacitor and resistor combination.

Ampere's circuital law teaches that the magnetic flux is proportional to current and Lenz' law teaches that eddy current is proportional to the time rate of change of magnetic flux. Eddy current is thus proportional to the time rate of change of current. As the current in the coil 14 decays more rapidly, the eddy current in the magnetic circuit increases. Increasing the impedance Z decreases the electrical circuit transient time while preventing arcing, but increases the eddy current in prior art electromagnetic clutches and brakes frequently to an unacceptable level. The present invention may be very effectively used in conjunction with an electrical circuit similar to that shown in FIGURE 5. The impedance Z may be made as large as physically practical to eliminate arcing and shorten electrical circuit transient time without concern for eddy current effects which are eliminated or greatly reduced by the substantially-radial gaps. The present invention provides a solution to the switching time problem which could not be provided by external electrical circuitry such as the impedance Z.

Although only one embodiment of the present invention has been shown and described in detail and various modifications of those embodiments described, those skilled in the art will appreciate that variations may be made in the embodiment described without departing from the scope and spirit of the present invention.

I claim:
1. An electromagnetic clutch or brake comprising:
   a first annular rotatable torque transmitting member;
   a second annular rotatable torque transmitting member having means for engaging the first torque transmitting member;
   an electromagnetic means operatively disposed to generate an annular flux loop to selectively engage and disengage said first and second torque transmitting members, said electromagnetic means having a tendency to induce an unwanted eddy current circularly through one or more of said first and second torque transmitting members; and
   at least one of said first and second torque transmitting members having an electrically non-conducting gap formed therein, said gap formed along a substantially radial plane and extending fully through a radial segment of said torque transmitting member to interrupt the eddy current circuit while not substantially interfering with said flux loop.

2. An electromagnetic clutch or brake as claimed in claim 1 wherein said electrically non-conducting gap means are formed in both of said first and second torque transmitting members.

3. An electromagnetic clutch or brake as claimed in claim 1 including an electromagnetic impedance means connected in shunt with said electromagnetic means.

4. An electromagnetic clutch or brake comprising:
   a first annular rotatable torque transmitting member;
   a second annular rotatable torque transmitting member having means for engaging the first torque transmitting member;
   an annular non-rotatable magnet body member;
   an electromagnetic coil means disposed in said annular magnet body member and operative to generate an annular flux loop to selectively engage and disengage said first and second torque transmitting members, said electromagnetic coil means having a tendency to induce an unwanted eddy current circularly through one or more of the aforementioned annular members; and
   at least one of said annular members having an electrically non-conducting gap formed theretin, said gap formed along a substantially radial plane and extending fully through a radial segment of said annular member to interrupt the eddy current circuit while not substantially interfering with said annular flux loop.

5. An electromagnetic clutch or brake as claimed in claim 4 wherein said electrically non-conducting gap means are formed in more than one of said annular members.

6. An electromagnetic clutch or brake as claimed in claim 4 including an electromagnetic impedance means connected in shunt with said electromagnetic coil means.

References Cited

UNITED STATES PATENTS

| | | | |
|---|---|---|---|
| 1,823,334 | 9/1931 | Payne | 192—84 |
| 2,320,721 | 6/1943 | Ericsom | 310—110 X |
| 2,606,948 | 8/1952 | Jaeschke | 310—105 |
| 2,701,315 | 2/1955 | Winther | 310—105 |
| 2,875,876 | 3/1959 | Rudisch | 192—84 |
| 2,950,795 | 8/1960 | Fischer | 192—84 X |
| 3,082,933 | 3/1963 | Bernard | 192—84 X |

MARK NEWMAN, *Primary Examiner.*

ARTHUR T. McKEON, *Examiner.*